Feb. 15, 1927.
P. S. MABIE
1,617,819
LIQUID LEVEL INDICATOR
Filed Aug. 15, 1925
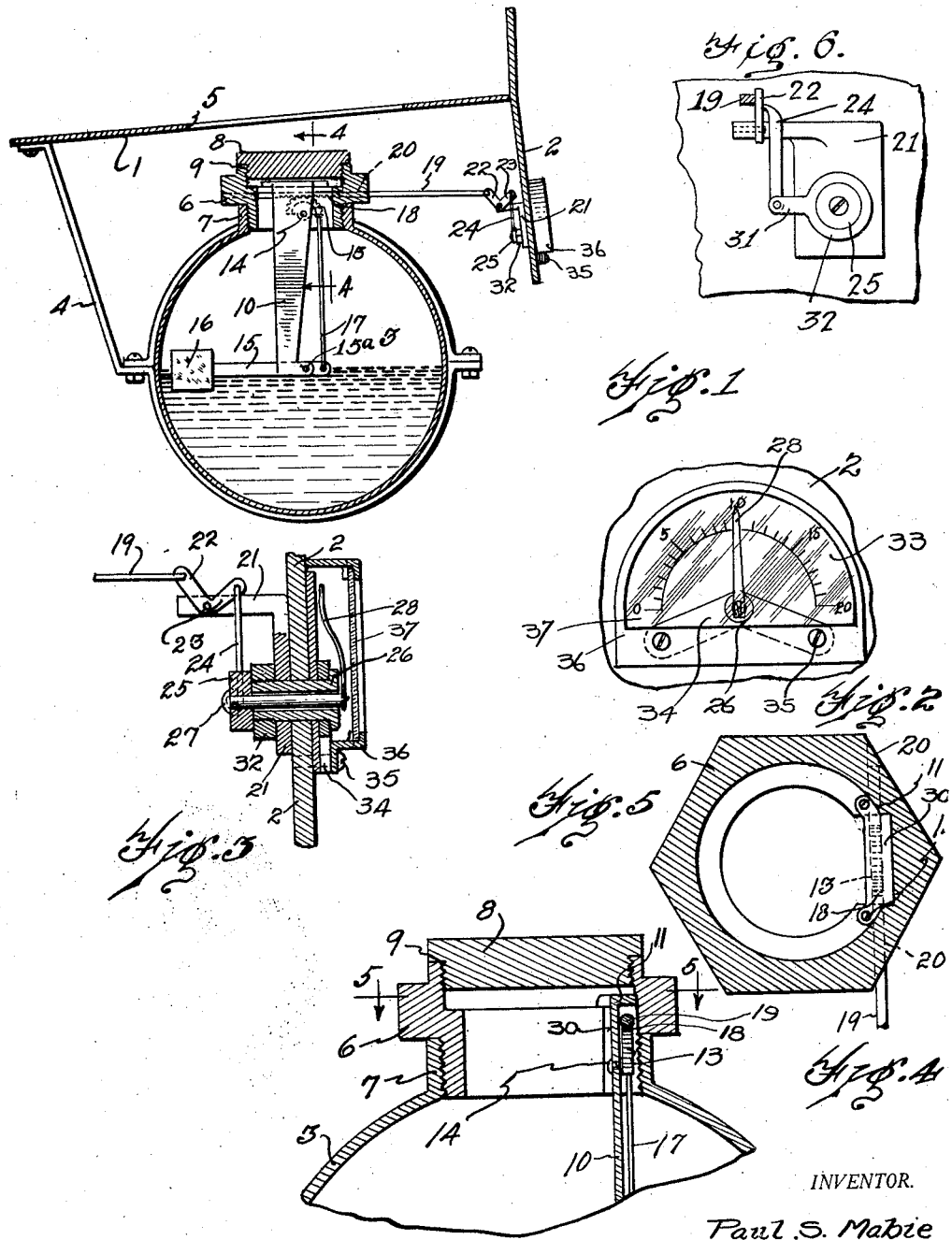
INVENTOR.
Paul S. Mabie
BY Gerald S. Baldwin
ATTORNEY.

Patented Feb. 15, 1927.

1,617,819

UNITED STATES PATENT OFFICE.

PAUL S. MABIE, OF DETROIT, MICHIGAN.

LIQUID-LEVEL INDICATOR.

Application filed August 15, 1925. Serial No. 50,360.

This invention aims to provide a liquid level indicator which is primarily intended for use in connection with gasoline tanks so arranged under cowls of automobiles that there is a minimum of headroom between the top of the filler opening and the underside of the cowl.

At the present time gasoline tanks thus located are not easy to reach or see, particularly for people who are not tall, without getting dirty from contact with the car, and gauges arranged on the top of the filler opening and below the level of the top of the cowl are open to the same objection.

It is an object of the present invention to provide a liquid level indicator consisting of two main parts; firstly a bushing, to be secured to the filler opening of the tank, having a rack arranged through it and a quadrant operated by a float in the tank in mesh with the rack; and secondly a dial secured as to an instrument board in front of which a pointer is rotated by a mechanism operated by the movement of the rack, so that the bushing and the parts intended to operate in the tank can be inserted therein subsequent to their assembly, and the rack connected to the parts mounted on the instrument board after said parts have been placed in position.

With these and other objects in view, the invention consists in certain novel construction and combination of parts hereinafter more fully described with the aid of the accompanying drawings and claimed.

Figure 1 is a sectional elevation of the invention.

Figure 2 is a detail of the gauge.

Figure 3 is an enlarged view showing the instrument board in section and part of the operating mechanism.

Figure 4 is a section on the line 4—4 of Figure 1, and

Figure 5 is a section on the line 5—5 of Figure 4.

Fig. 6 is a detail.

Referring more particularly to the drawings, 1 designates the cowl of an automobile and 2 the instrument board. 3 indicates the gasoline tank supported as by a member 4 from the cowl, and the latter is provided with an opening 5 immediately above the tank.

The bushing 6 is in threaded engagement with the filler opening 7, and the original tank cap 8 is screwed into the top of the bushing at 9, where the thread provided is similar to that in the filler opening 7.

The depending element 10 has a horizontal upper portion 11 with projecting sides which are secured as by screws 12 to the bushing 6. A segmental gear 13 is revolvably mounted on the element at 14, and at the lower end of the element a lever arm 15 is pivotally arranged at 15$^a$. On one end of the lever arm a float 16 is placed, and to the other end of the lever arm a rod 17 is secured, the opposite end of which latter is fastened to the quadrant 13. A rack 18 is provided on the underside of the member 19 for a portion of its length, and meshes with the gear. 20 indicates an opening through the sides of the bushing through which the member 19 passes. It will be noted that a portion of the bushing is cut away at 30 to allow the rod 17 and depending element 10 to be placed at one side of the hole in the bushing, so that as large a cross sectional area as possible may be left free to facilitate filling the tank.

On the instrument board 2 a bracket 21 is arranged on which a bell crank having arms 22 and 23 is pivotally mounted. The arm 22 is connected to the member 19, and the arm 23 is connected by means of the link 24 to the arm 31 integral with the collar 25.

The dial 33 and support 34 are held in position on the instrument board by the hollow bolt 26, the latter also supports the bracket 21 and is secured by the nut 32. The pin 27 which is a tight fit in the arm 31 passes through the hollow bolt 26 and has a pointer 28 mounted at its opposite end. The screws 35 which hold the sides of the dial 33 and support 34 also carry the casing 36 in which glass 37 is mounted.

From the foregoing it is believed that the method of operation of the device will be readily understood: As the float 16 rises and falls with the level of the liquid in the tank, the gear 13 turns one way or the other and causes the rack 18 and member 19 to move. This movement is transmitted through the arms 22 and 23, link 24, arm 31 and collar 25 to the pin 27 which is caused to rotate and thereby moves the pointer 28.

Having thus described my invention, what I claim as new and desire to secure by Letters Patent is:

1. In a liquid level indicator, the combination with a tank arranged under the cowl of an automobile and having its upper end in front of an instrument board, of a bushing screwed into the filler opening in said tank, a depending element secured to said bushing, a segmental gear mounted on said depending element near the upper end thereof, a lever arm pivotally arranged on said element near the lower end thereof, a float on one end of said lever arm, a rod connected to said segmental gear and also to the other end of said lever arm, said segmental gear being rotated by the movement of said lever arm and said rod, a rack meshing with said segmental gear, said bushing having an opening therethrough through which said rack extends, a bell crank lever turned by the movement of said rack, a gauge on the instrument board, a pointer revolvably mounted in said gauge, and means for turning said pointer by the movement of said bell crank lever.

2. In a liquid level indicator, the combination with a tank arranged under the cowl of an automobile and having its upper end in front of an instrument board, of bushing screwed into the filler opening in a tank, a depending element secured to said bushing, a segmental gear mounted on said depending element near the upper end thereof, a lever arm pivotally arranged on said element near the lower end thereof, a float on one end of said lever arm, a rod connected to said segmental gear and also to the other end of said lever arm, said segmental gear being rotated by the movement of said lever arm and said rod, a rack meshing with said segmental gear, said bushing having an opening therethrough through which said rack extends, a bell crank lever turned by the movement of said rack, a gauge on said instrument board, a hollow bolt passing through said instrument board and extending into said gauge, a rotatable pin extending through said hollow bolt, a pointer in said gauge secured to said pin, and means for turning said pin by the movement of said bell crank lever.

PAUL S. MABIE.